US007830528B2

(12) United States Patent
Koh et al.

(10) Patent No.: US 7,830,528 B2
(45) Date of Patent: Nov. 9, 2010

(54) 3D IMAGE MEASURING APPARATUS AND METHOD THEREOF

(75) Inventors: Kwangill Koh, Seoul (KR); Eun Hyoung Seong, Seoul (KR); Moon Young Jeon, Gyeonggi-do (KR); Min Young Kim, Seoul (KR); Seung Jun Lee, Seoul (KR)

(73) Assignee: Koh Young Technology, Inc., Seoul (KR)

( * ) Notice: Subject to any disclaimer, the term of this patent is extended or adjusted under 35 U.S.C. 154(b) by 795 days.

(21) Appl. No.: 11/637,040

(22) Filed: Dec. 12, 2006

(65) Prior Publication Data

US 2007/0133011 A1  Jun. 14, 2007

(30) Foreign Application Priority Data

Dec. 14, 2005  (KR) ...................... 10-2005-0123409
Dec. 14, 2005  (KR) ...................... 10-2005-0123412

(51) Int. Cl.
*G01B 11/24* (2006.01)
(52) U.S. Cl. ..................................... 356/601
(58) Field of Classification Search ........................ None
See application file for complete search history.

(56) References Cited

U.S. PATENT DOCUMENTS

| 4,606,638 | A  | 8/1986  | Sommargren |
| 5,135,309 | A  | 8/1992  | Kuchel et al. |
| 5,636,025 | A  | 6/1997  | Bieman et al. |
| 6,496,254 | B2 | 12/2002 | Bostrom et al. |
| 7,023,559 | B1 | 4/2006  | Coulombe et al. |

2002/0014577 A1  2/2002  Ulrich et al.

FOREIGN PATENT DOCUMENTS

| DE | 4007500       | 9/1991 |
| DE | 4027328       | 3/1992 |
| DE | 199 19 584 A1 | 11/2000 |
| JP | 06-174438     | 6/1994 |
| JP | 2002-134991   | 5/2002 |
| JP | 2002-168800   | 6/2002 |
| JP | 2003-504634   | 2/2003 |
| JP | 2003-258497   | 9/2003 |

(Continued)

OTHER PUBLICATIONS

A communication from the Japanese patent office in a counterpart foreign application dated Mar. 2, 2010.

(Continued)

*Primary Examiner*—Gregory J Toatley, Jr.
*Assistant Examiner*—Amanda H Merlino
(74) *Attorney, Agent, or Firm*—Jae Y. Park; Kile Park Goekjian Reed & McManus PLLC

(57) ABSTRACT

A three dimensional (3D) measuring apparatus and method are provided. The 3D image measuring apparatus includes a stage, a projection portion, and an imaging portion. The projection portion includes first and second lights, first and second lattices, and first and second projection lenses. The imaging portion includes an imaging lens and a camera. The projection portion further includes a movement instrument which controls the first and the second lattices through a predetermined number of movement actions during operation of the measuring apparatus.

18 Claims, 6 Drawing Sheets

| | FOREIGN PATENT DOCUMENTS | | | | |
|---|---|---|---|---|---|
| JP | 3525964 | 5/2004 | WO | WO01/06210 | 1/2001 |
| JP | 2004-191240 | 7/2004 | WO | WO2004/070316 | 8/2004 |
| JP | 2004-226331 | 8/2004 | | | |

OTHER PUBLICATIONS

Office Action issued by German Patent Office, dated Apr. 22, 2010.

3D IMAGE MEASURING APPARATUS AND METHOD THEREOF

BACKGROUND OF THE INVENTION

The present invention relates to a 3 dimensional (3D) image measuring apparatus and method, and more particularly, to a 3D image measuring apparatus and method, which can emit a light towards one surface and another surface of a measurement object by using a plurality of lights and filters, and thereby can remove a shadow area which may incur when measuring a 3D image.

Hereinafter, a conventional 3D image measuring apparatus will be described with reference to FIG. 1.

The 3D image measuring apparatus shown in FIG. 1 includes a projection device 10, an imaging device 20, a control device 30, and a displacement measuring device 40. Each configuration thereof will be described.

Initially, the projection device 10 includes a lattice (not illustrated), and a light generated from the projection device 10 passes through the lattice and is projected towards one surface of a measurement object 0. When the light according to a lattice-shaped pattern is emitted towards one surface of the measurement object 0, the imaging device 20 takes an image thereof. Specifically, the imaging device 20 takes the image which is formed by the projected light on the measurement object 0, and transmits the taken image to the control device 30. The displacement measuring device 40 measures a displacement of a distance from the imaging device 20 to the measurement object 0, and transmits the measured displacement to the control device 30. The control device 30 calculates a displacement distance from the imaging device 20 to the measurement object 0 by using the transmitted displacement information from the displacement measuring device 40, calculates a height by using the transmitted image from the imaging device 20, and measures the 3D image of the measurement object 0 by using the calculated height information.

As described above, the conventional 3D image measuring apparatus acquires an image by projecting the light towards only one surface of a measurement object, and thus may not precisely measure the measurement object due to a shadow which is formed on another surface of the measurement object.

SUMMARY OF THE INVENTION

The present invention is conceived to solve the above-described problems in the conventional art, and thus, the present invention provides a 3D image measuring apparatus and method which can remove a shadow area by emitting a light according to a lattice-shaped pattern towards both surfaces of an inspection object, acquiring a transformed image by the inspection object, and thereby measuring a 3D image.

The present invention also provides a 3D image measuring apparatus and method which can change optical properties of a light by using a plurality of filters and thereby acquire a more precise image. In this instance, the 3D image measuring apparatus may be more compactly constructed by applying a light path converter to the 3D image measuring apparatus.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Figure 1:
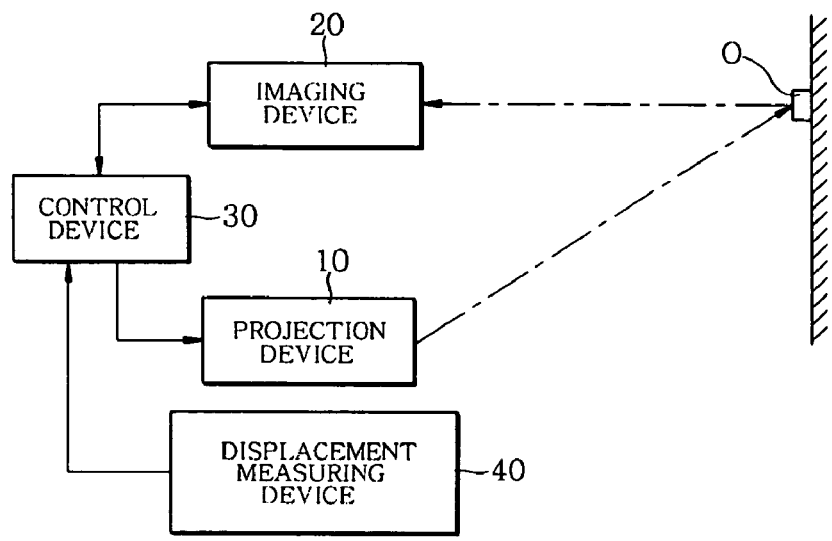
FIG. 1 is a diagram illustrating a 3D image measuring apparatus according to a conventional art.

According to an aspect of the present invention, there is provided a 3-dimensional (3D) image measuring apparatus including: an XY stage having a base member, which is formed with a plurality of identification marks; a projection portion comprising a first light and a second light which generate a light, a plurality of projection lenses which is installed on one surface of the first light and the second light respectively, a lattice board which is provided between the first and second lights and the plurality of projection lenses, and formed with a plurality of lattices, and a projection portion movement instrument which moves the lattice board into a vertical direction to an emitted direction of the generated light from the first light and the second light; a light path converter comprising a plurality of mirrors which is provided on one surface of the projection portion, and spaced apart from each other at predetermined intervals, a first filter and a second filter which are provided in a lower portion of the plurality of mirrors respectively, and adjust and filter optical properties of a light, having passed through the plurality of mirrors, and a third light which is provided between the first filter and the second filter to emit the light towards an inspection object; and an imaging portion comprising a third filter, an imaging lens which is provided in an upper portion of the third filter to image the light, having passed through the third filter, and an camera which is provided in an upper portion of the imaging lens to take an image, having passed through the imaging lens.

According to another aspect of the present invention, there is provided a 3D image measuring method including: positioning a base member in an inspection area of an XY stage; switching on a first light to a position, an angle, and a brightness, which is predetermined by a lattice movement and light control device, when the base member is positioned in the inspection area; projecting a generated light towards the base member via a first lattice and a first projection lens of a projection portion and a first mirror, a third mirror, and a first filter of a light path converter, when the first light is switched on and the light is generated from the first light; acquiring an image while moving an lattice movement actuator as many as a predetermined number, when the light is projected towards the base member; acquiring a reference phase with respect to the first light by a bucket algorithm when the image is acquired; acquiring a reference phase with respect to a second light by switching on the second light, and using a second lattice and a second projection lens of the projection portion, and a second mirror, a fourth mirror, and a second filter of the light path converter while acquiring the reference phase with respect to the first light; positioning an inspection object in a predetermined part of the base member when the reference phase with respect to each of the first light and the second light is acquired; measuring the inspection object by switching on any one of a third light and a fourth light to the brightness predetermined by the lattice movement and light control device, and thereby sensing a position of a first identification mark and a second identification mark, checking a position of the inspection object, and limiting an inspection area, when the inspection object is positioned on the base member; moving the inspection object by using a first motor and a second motor when the position of the inspection object is checked; projecting a light, which is generated by switching on the first light to the brightness predetermined by the lattice movement and light control device, towards the inspection object via the first lattice and the first projection lens of the projection portion and the first mirror, the third minor, and the first filter of the light path converter, every time the inspection object is moved; acquiring an image reflected from the inspection object via the camera of the imaging portion and a third filter of the light path converter when the generated light from the first light is projected towards the inspection object; measuring a phase of the inspection object by using the acquired image when a lattice image with respect to the first light is acquired, and then acquiring 3D information of the inspection object by using a difference between the reference phase and the measured phase; acquiring 3D information of the inspection object with respect to the second light by using the light generated from the second light via the second lattice, the second projection lens, the second mirror, the fourth mirror, and the second filter when the 3D information of the inspection object with respect to the first light is acquired; calculating a sheet of 2D image with respect to the inspection object without another light by using an average gray value of each pixel of the camera of each image acquired by the first light, and finding a shadow position and a bright area by using a gray brightness value, when the 3D information of the inspection object with respect to the second light is acquired; and acquiring final 3D information of the inspection object by exchanging a part corresponding to the shadow position with respect to the first light with the 3D information acquired by the second light, and using the corrected 3D information via the second light.

Hereinafter, embodiments of the present invention will be described with reference to the accompanying drawings.

Figure 2:
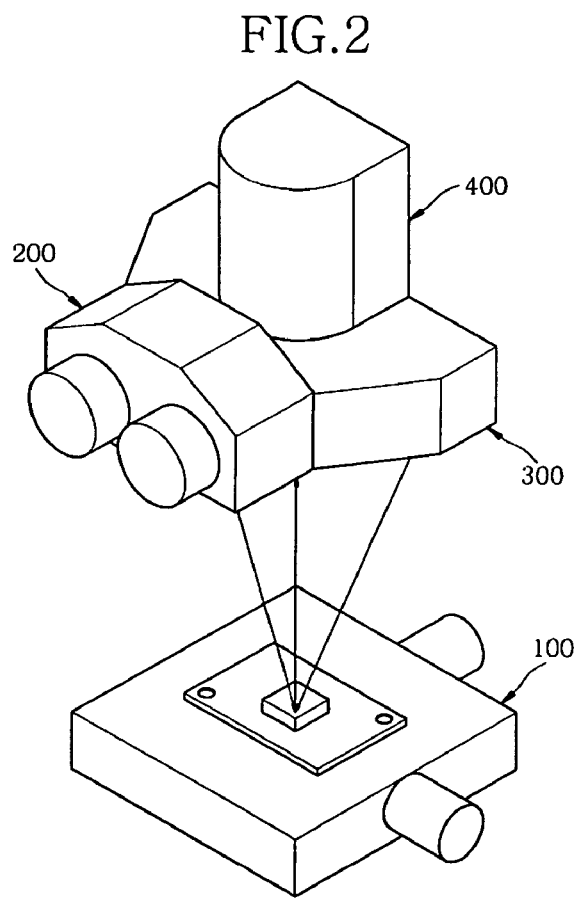
FIG. 2 is a perspective view illustrating a 3D image measuring apparatus according to the present invention.

FIG. 2 is a perspective view illustrating a 3D image measuring apparatus according to the present invention. As shown in FIG. 2, the 3D image measuring apparatus includes an XY stage 100, a projection portion 200, a light path converter 300, an imaging portion 400, a first control portion 500, and a second control portion 600 (see FIGS. 9 and 10).

Figure 3:
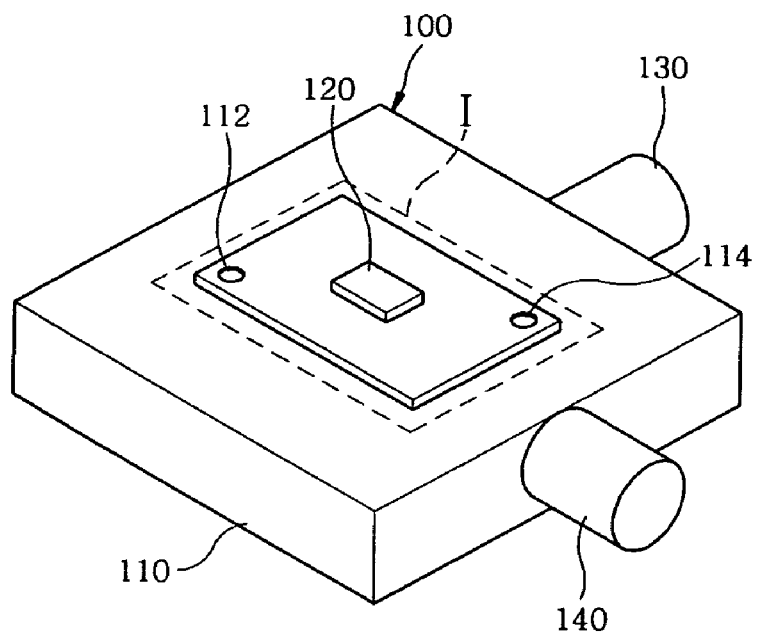
FIG. 3 is an enlarged perspective view illustrating an XY stage illustrated in FIG. 2.

As shown in FIG. 3, the XY stage 100 includes a base member 110 on a top surface. A first identification mark 112 and a second identification mark 114 are formed on a top surface of the base member 110. Also, an inspection object 120 for a 3D inspection is placed on a center of the base member 110. Also, the XY stage 100 is constructed to be capable of moving towards an XY direction by a first motor 130 and a second motor 140 which are installed on one side and another side of the XY stage 100 respectively.

Figure 4:
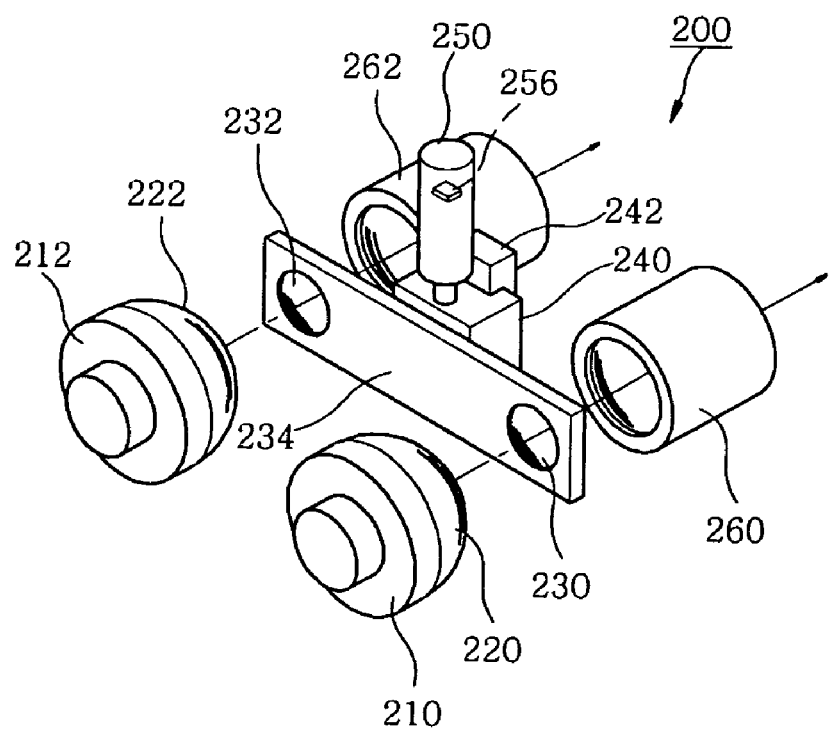
FIG. 4 is a perspective view illustrating a projection portion illustrated in FIG. 2.

As shown in FIG. 4, the projection portion 200 includes a first light 210 and a second light 212 which emit the light. In this instance, the first light 210 and the second light are spaced apart from each other at a predetermined distance. Also, a first condenser 220 and a second condenser 222 are provided on one surface of the first light 210 and the second light 212 respectively. In this instance, the first light 210 and the second light 212 are controlled to be selective switched on/off by a lattice movement and light control device 270. Also, a first projection lens 260 and a second projection lens 262 are provided on one surface of the first light 210 and the second light 212, and a lattice board 234 is provided between the first and second lights 210 and 212, and the first and second projection lenses 260 and 262. In this instance, the lattice board 234 is formed with a first lattice 230 and a second lattice 232 which are spaced apart from each other in a length wise direction of the lattice board 234 at a predetermined interval. Also, a projection portion movement instrument is installed on one surface of the lattice board 234 which includes the first lattice 230 and the second lattice 232.

The projection portion movement instrument includes a projection portion linear motion (LM) guide 240 which is installed on one surface of the lattice board 234, a projection portion LM rail 242 which receives the projection portion LM guide 240, and a lattice movement actuator 250 which is installed in the projection portion LM guide 240 to drive the projection portion LM guide 240. In this instance, the lattice movement actuator 250 is driven according to a control of the lattice movement and light control device 270. Also, the projection portion LM guide 240 moves into a predetermined direction (up and down) along the projection portion LM rail 242 and thereby moves the lattice board 234. Specifically, since the lattice board 234 connects with the projection portion LM guide 240, the lattice board 234 may move into the predetermined direction according to the movement of the projection portion LM guide 240.

Also, a feedback sensor 256 is installed on one surface of the lattice movement actuator 250 so as to recognize a movement position of the first lattice 230 and the second lattice 232. In this instance, representative examples of the feedback sensor 256 include a strain gauge sensor which has a different resistance value depending upon expanding and shrinking of a material or an electrostatic capacity sensor which determines a difference of a concentrating electric charge amount according to a distance interval.

Figure 5:
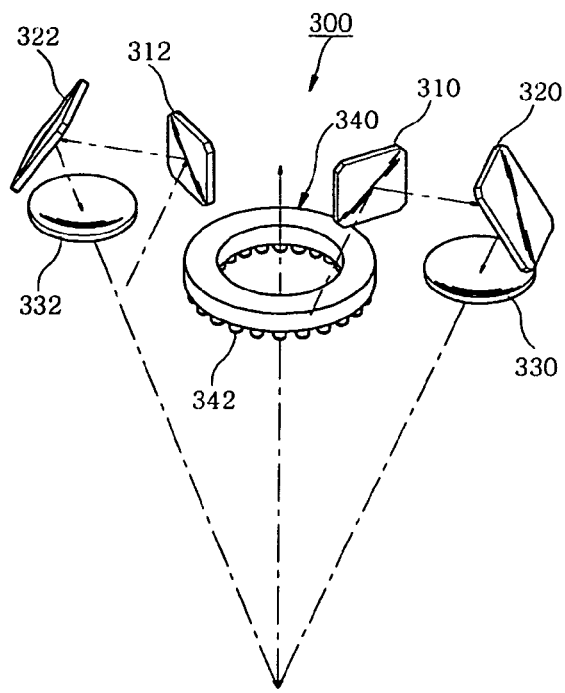
FIG. 5 is a perspective view illustrating a light path converter illustrated in FIG. 2.

As shown in FIG. 5, the light path converter 300 is provided on one surface of the projection portion 200 to convert the path of light projected from the projection portion 200. In this instance, the light path converter 300 includes a first mirror 310 and a second mirror 312 which are spaced apart from each other at a predetermined interval to reflect the light from the first projection lens 260 and the second projection lens 262. Also, the first mirror 310 and the second mirror 312 are installed to be inclined towards a horizontal direction and, desirably, may be inclined with an angle of 45°. Depending upon circumstances, the first mirror 310 and the second mirror 312 may be installed at a different angle of inclination.

The light, which has passed through the first mirror 310 and the second mirror 312, passes through a third mirror 320 and a fourth mirror 322 whereby the light path is changed. Thus, the light having its path changed is projected towards the inspection object 120 via a first filter 330 and a second filter 332. The first filter 330 and the second filter 332 are provided in a lower portion of a third mirror 320 and a fourth mirror 322, filters the light, having passed through the first lattice 230 and the second lattice 232, and then emits the filtered light towards the base member 110 or emits the filtered light towards one surface and another surface of the inspection object 120 in turn an N number of times. In this instance, the third mirror 320 and the fourth mirror 322 are installed to be inclined towards a vertical direction. Depending upon a user's request, an angle of inclination may be set to a range of about 20° to about 80°.

The first filter 330 and the second filter 332 change optical properties of the light which is emitted towards the inspection object 120, and thus utilizes any one of a frequency filter, a color filter, a polarized light filter, and an optical strength adjustment filter.

In this instance, the frequency filter utilizes an ultraviolet ray removal filter for removing a wavelength of less than 400 nm, and an infrared ray removal filter for removing a wavelength of less than 700 nm. Also, the color filter utilizes a red filter, a green filter, and a blue filter to make the light pass through a particular frequency band in a visible ray area. For example, when inspecting a Printed Circuit Board (PCB), a red filter and a green filter corresponding to a background color of the PCB are usually utilized. Specifically, the green filter is utilized for the PCB in series of a red color, and the red filter is utilized for the PCB in series of a green color. Also, the optical strength adjustment filter is utilized to adjust the range of the optical strength to be within a range from about 50% to 100%, and also adopts a neutral density filter. The polarized light filter utilizes a linear polarized light filter to attenuate effects that an incident light is reflected from the inspection object 120 and imaged in the imaging portion 400.

Figure 6:
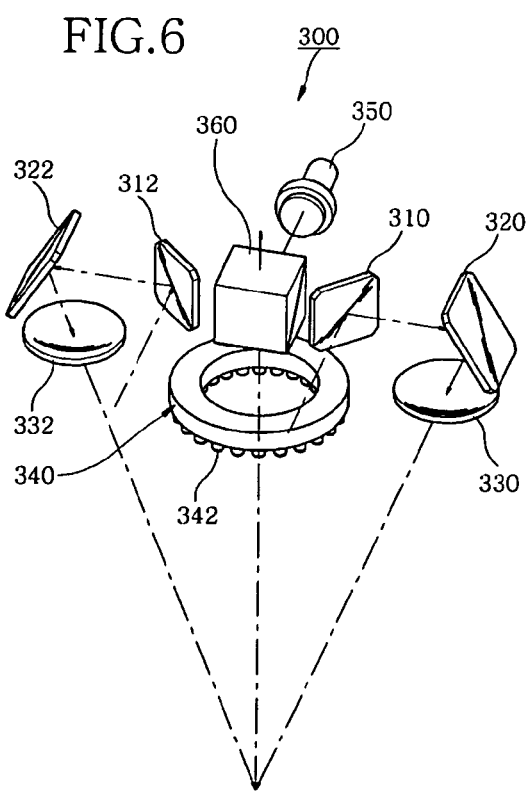
FIG. 6 is a perspective view illustrating another example of the light path converter illustrated in FIG. 5.

The light emitted towards the base member 110 or the inspection object 20 forms an image by a lattice pattern which is transformed by the inspection object 10. The transformed lattice pattern image passes through the third light 340 in the shape of a O-ring. In this instance, a plurality of light emitting diode (LED) devices 342 is provided in the third light 340 and spaced apart from each other at predetermined intervals. Also, as shown in FIG. 6, a beam splitter 360 is provided above the third light 340, i.e. between the first mirror 310 and the second mirror 312. A fourth light 350 is further provided on one side surface of the beam splitter 360.

The third light 340 corresponds to an indirect light which is inclined with respect to an optical axis of the camera 420 of the imaging portion 400 and thereby emitted towards an object. Therefore, if the third light 340 is used when the first identification mark 112 and the second identification mark 114 have a scattered reflection metal surface property, the first identification mark 112 and the second identification mark 114 may be effectively recognized when observing the first and second identification marks 112 and 114 via the camera 420. Conversely, the fourth light 350 corresponds to a direct light which is emitted towards an object via the optical axis and a dynamic axis of the camera 420. Therefore, if the fourth light 350 is used when the first identification mark 112 and the second identification mark 114 have a mirror surface reflection metal surface property, the first identification mark 112 and the second identification mark 114 may be effectively recognized when observing the first and second identification marks 112 and 114 via the camera 420.

The light generated from the third light 320 is emitted towards the inspection object 120 with a comparatively great incidence angle and then reflected on the surface of the inspection object 120, and inputted into the imaging portion 400. Also, the light generated from the fourth light 350 becomes the optical axis and the dynamic axis of the imaging portion 400 via the beam splitter 360. The generated light is emitted towards the inspection object 120 with a comparatively narrow incidence angle and then reflected on the surface of the inspection object 120, and inputted into the imaging portion 400. In this instance, the incidence angle of the third light 340 may be from about 2° to 35°. Also, the incidence angle of the fourth light 350 may be within 10°. In the present embodiment, the incidence angle of the third light 340 uses the range of 5° to 20°, and the incidence angle of the fourth light 350 uses a range of within 5°.

The first identification mark 112 and the second identification mark 114 comparatively well reflect the incident light, and may be classified into a type of high scattered reflection metal surface property and a type of high mirror surface reflection metal surface property according to a surface processing state. In this instance, the first identification mark 112 and the second identification mark 114 may be made of a metal material having a property of reflecting light rather than absorbing the light, and may have a different light reflection property according to a surface roughness of the first and second identification marks 112 and 114 which is processed by an etching method.

In the case of a great surface roughness, the incident light is reflected on the metal surface a number of times and then the reflected light is directed into various directions irrespective of the direction of the incident light. The above-described property is called the metal surface with a scattered reflection property. Conversely, in the case of a minute surface roughness, the incident light occurs a mirror surface reflection whereby an angle consisting of a vertical normal of the incident light and the surface, and the reflected light is formed to be identical and thus the incident light is reflected on the surface. The above-described property is called the metal surface with a mirror surface property.

Figure 7:
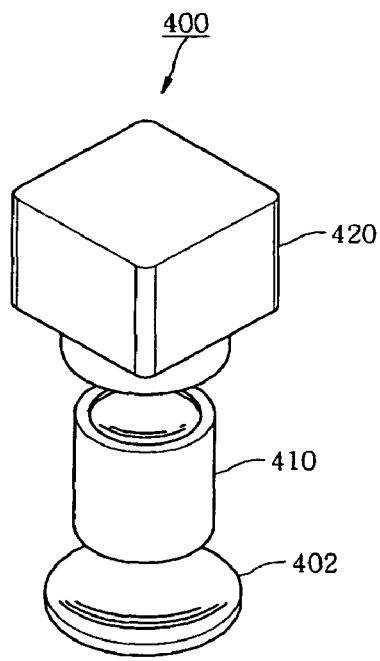
FIG. 7 is a perspective view illustrating an imaging portion illustrated in FIG. 2.

As shown in FIG. 7, in the imaging portion 400, an imaging lens 410 is provided on the bottom of the camera 420, and a third filter 402 is provided on the bottom of the imaging lens 410. Therefore, in the imaging portion 400, the transformed image through the third filter 402 is acquired by the camera 420 via the imaging lens 410. The third filter 402 functions to change optical properties of the light that is reflected from the inspection object 410 and inputted into the imaging portion 400. Here, "change of the optical properties of the light" indicates an operation of passing a light by limiting the frequency range of the light passing through a corresponding filter, adjusting the optical strength, limiting the polarization direction of the light or changing the polarization property of light. Also, the third filter 402 utilizes any one of a frequency filter, a color filter, a polarized light filter, an optical strength adjustment filter, and the like.

Figure 8:
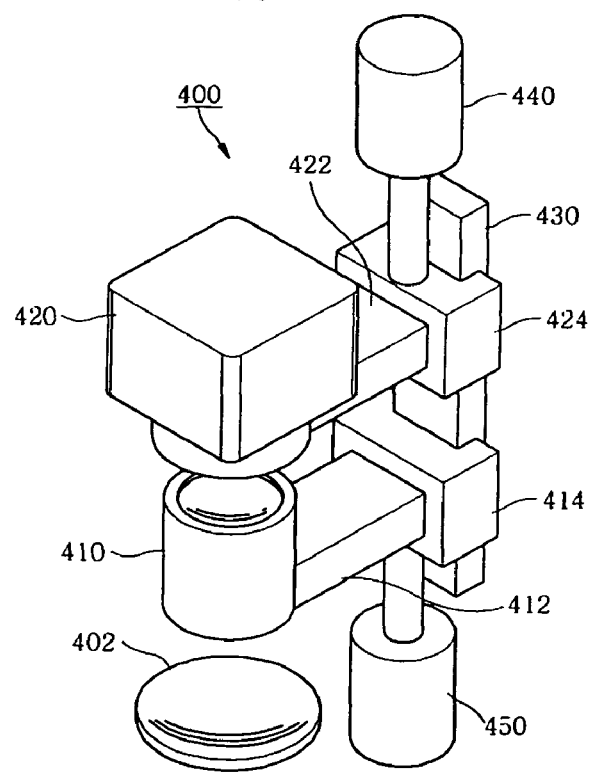
FIG. 8 is a perspective view illustrating another example of the imaging portion illustrated in FIG. 7.

According to another embodiment of the present invention, as shown in FIG. 8, the imaging lens 410 and the camera 420 of the imaging portion 400 may be movably provided. Specifically, the imaging lens 410 and the camera 420 are provided to a first imaging portion support member 412 and a second imaging portion support member 422 respectively. The first and second imaging portion support members 412 and 422 are provide to a first imaging portion LM guide 414 and a second imaging portion LM guide 424 respectively. A third motor 440 and a fourth motor 450 are provided on one surface of the first and second imaging portion LM guide 414 and 424 respectively. In this instance, each of the first and second imaging portion LM guides 414 and 424 are provided on an imaging portion LM rail 430. Therefore, the imaging lens 410 and the camera 420 may be moved to a predetermined position according to an operation of the third motor 440 and the fourth motor 450, and thus the imaging portion 400 may perform a zoom function. In this instance, it is desirable that a filter, as described above, is used for the third filter 402.

A configuration of a plurality of control portions 500, 550, 600, and 650, which generally controls an operation of a 3D image measuring apparatus according to the present invention constructed as described above will be described with reference to FIGS. 9 and 10.

Figure 9:
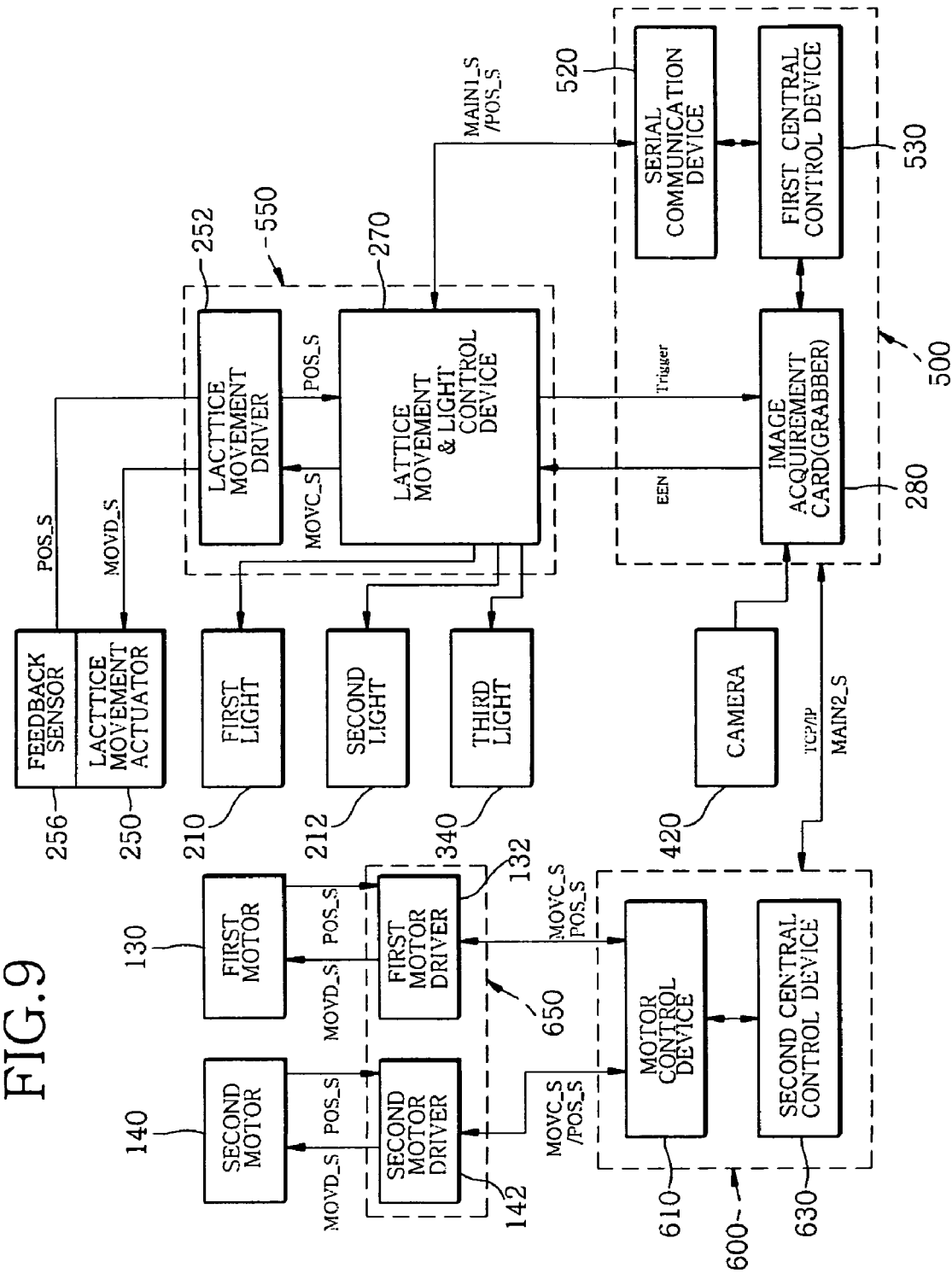
FIG. 9 is a block diagram illustrating a configuration of a plurality of control portions controlling the 3D image measuring apparatus illustrated in FIG. 2.
Figure 10:
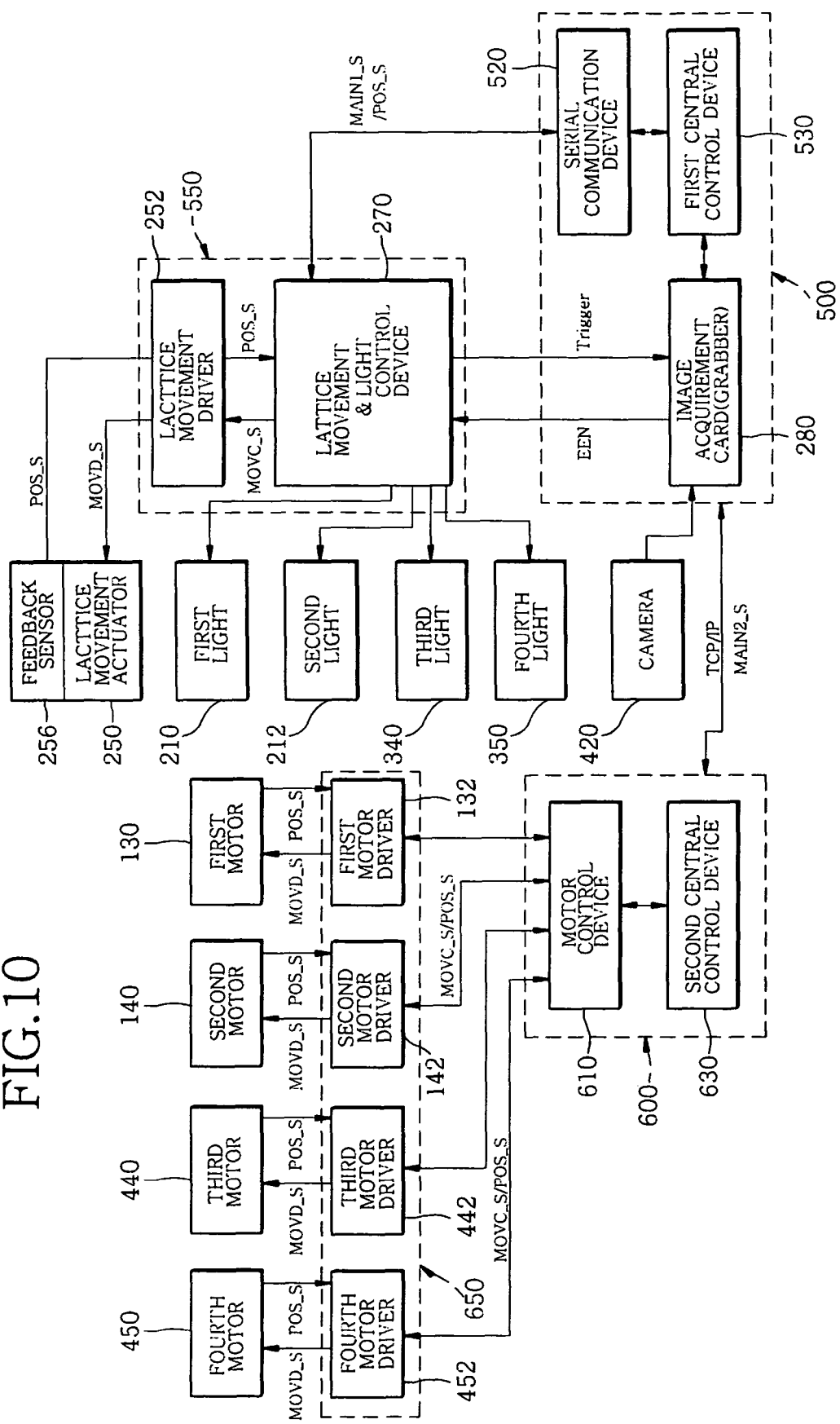
FIG. 10 is a block diagram illustrating another example of the plurality of control portions illustrated in FIG. 9.

FIG. 9 illustrates a configuration of the plurality of control portions 500, 550, 600, and 650 when the third motor 440 and the fourth motor 450 are not provided to the imaging portion 400 and the fourth light 350 is not provided to the light path converter 300 in the 3D image measuring apparatus according to an embodiment of the present invention. Also, FIG. 10 illustrates a configuration of the plurality of control portions 500, 550, 600, and 650 when the third motor 440 and the fourth motor 450 are provided to the imaging portion 400 and the fourth light 350 is provided to the light path converter 300 in the 3D image measuring apparatus according to another embodiment of the present invention. The configuration of the plurality of control portions 500, 550, 600, and 650 will be described.

As shown in FIGS. 9 and 10, the plurality of control portions 500, 550, 600, and 650 generally includes a first control portion 500, a second control portion 600, and a first auxiliary control portion 550 and a second auxiliary control portion 650.

The first auxiliary control portion 550 connects with the projection portion 200 and the light path converter 300 respectively to drive the lattice movement actuator 250 of the projection portion 200 and selectively switch on/off each of the first through fourth lights 210, 212, 340, and 350. The second auxiliary control portion 650 connects with the XY stage 100 to drive the first motor 130 and the second motor 140 of the XY stage 100. Also, when the imaging portion movement instrument is provided to the imaging portion 400, the second auxiliary control portion 650 adjusts an interval between the imaging lens 410 and the camera 420 or adjusts a magnification for the zoom function by controlling the third motor 440 and the fourth motor 450, which drive the first and second imaging portion LM guides 412 and 424, and thereby moving the imaging lens 410 and the camera 420. Also, the second control portion 600 connects with the second auxiliary control portion 650 to control the same, and the first control portion 500 connects with the first auxiliary control portion 550 and the second control portion 600 to control the same.

Hereinafter, the configuration of the plurality of control portions 500, 550, 600, and 650 having the connections as described above will be described.

The first control portion 500 includes an image acquirement card(grabber) 280, a serial communication device 520, and a first central control device 530.

The serial communication device 520 is provided for a serial communication with the first auxiliary control portion 550, and thus outputs a first main control signal MAIN1_S to the lattice movement and light control device 270, and receives a position signal POS_S outputted from the lattice movement and light control device 270, and outputs the received position signal POS_S. Also, the first central control device 530 receives the position signal POS_S outputted from the serial communication device 520.

When the position signal POS_S is received, the first central control device 530 calculates a movement position of the lattice board 234 of the projection portion 200 by using the received position signal POS_S. When a light brightness, a lattice movement interval, and the like, is set, the first central control device 530 generates the first main control signal MAIN1_S to selectively control the lattice board 234 which includes the first lattice 230 and the second lattice 232 provided on the projection portion 200 and the light path converter 300, and the first through third lights 210, 212, and 340, or the fourth light 350, and outputs the generated first main control signal MAIN1_S. Also, the first central control device 530 generates a second main control signal MAIN2_S to activate at least two of the first through fourth motors 130, 140, 440, and 450, and outputs the generated second main control signal MAIN2_S.

The image acquirement card 280 connects with the imaging portion 400, and thereby receives an image outputted from the imaging portion 400, converts an analog signal into a digital signal, outputs the digital signal, and generates an light enable signal ENN to selective switch on/off the first through fourth lights 210, 212, 340, and 350. Also, when a trigger signal is received from the lattice movement and light control device 270, the image acquirement card 280 controls the imaging portion to take an image, and outputs the taken image to the first central control device 530. When the image is received from the image acquirement card 280, the first central control device 530 calculates a phase of the base member 110 or the inspection object 120 by using the received image, and also calculates 3D information of the inspection object 120 by using the calculated phase.

The first auxiliary control portion 550, which receives the first main control signal MAIN1_S outputted from the first control portion 500, includes a lattice movement driver 252 and the lattice movement and light control device 270.

The lattice movement driver 252 receives a movement control signal MOVC_S, generates a movement drive signal MOVD_S, thereby drives the lattice movement actuator 250 of the projection portion 200, and receives the position signal POS_S outputted from the feedback sensor 250 and outputs the received position signal POS_S. When the position signal POS_S is received from the lattice movement driver 252, the lattice movement and light control device 270 receives the received position signal POS_S, and transmits the same to the serial communication device 520. Also, the lattice movement and light control device 270, which transmits the position signal POS_S, receives the first main control signal MAIN1_S, generates a movement control signal MOVC_S, and outputs the generated movement control signal MOVC_S to the lattice movement driver 252. Also, the lattice movement and light control signal 270 receives the light enable signal EEN outputted from the image acquirement card 28, and thereby selectively switches on/off the first light 210 and the second light 212 of the projection portion 200 or selectively switches on/off the third light 340 and the fourth light 350 of the light path converter 300. When at least one of the first through fourth lights 210, 212, 340, and 350 is selectively switched on by selectively switching on the same, a trigger signal is generated and outputted to the image acquirement card 280. When the trigger signal is received, the image acquirement card 280 controls the camera 420 of the imaging portion 400 to start taking an image.

The XY stage 100 is required to be driven so that the camera 420 may measure the base member 110 or the inspection object 120. The second control portion 600 is provided to control the XY stage 100. The second control portion 600 may connect with the first control portion 500 by using a serial or parallel communication protocol or a Transmission control protocol/Internet Protocol (TCP/IP), and includes a motor control device 610 and a second central control device 630.

The motor control device 610 receives motor rotation information, generates the movement control signal MOVC_S, and outputs the generated movement control signal MOVC_S to the first through fourth motor drivers 132, 142, 442, and 452. Also, the motor control device 610 receives the position signal POS_S outputted from each of the first through fourth motor drivers 132, 142, 442, and 452, and outputs the received position signal POS_S. A second central control device 630 receives the position signal POS_S outputted from the motor control device 610, and thereby calculates the movement position of the XY stage 100 to be moved by the first motor 130 and the second motor 140, or calculates the movement position of the imaging lens 410 and the camera 420 of the imaging portion 400 to be moved by the third motor 440 and the fourth motor 450. Also, the second central control device 630 receives a second main control signal MAIN2_S outputted from the first central control device 530, and generates and outputs motor rotation information to move the XY stage 100 and the imaging lens 410 and the camera 420 of the imaging portion 400.

As shown in FIG. 9, the second auxiliary portion 640, which receives the movement control signal MOVC_S outputted from the motor control device 610, includes the first motor driver 132 and the second motor driver 142. Specifically, the first and second motor drivers 132 and 142 receive the movement control signal MOVC_S and drive the first and second motors 130 and 140 of the XY stage 100, respectively. Also, the first and second motor drivers 132 and 142 receive the position signal POS_S outputted from the first and second motors 130 and 140, i.e. the position signal POS_S, which is outputted to an encoder sensor (not shown) installed in each of the first and second motors 130 and 140, and outputs the received position signal POS_S to the motor control device 610.

According to another embodiment of the present invention, as shown in FIG. 10, the second auxiliary control portion 650 includes the first through fourth motor drivers 132, 142, 442, and 452. In this instance, the first and second motor drivers 132 and 142 function as the same as the first and second motor drivers 132 and 142 shown in FIG. 9. Also, the third and fourth motor drivers 442 and 45 receive the position signal POS_S outputted from each of the third and fourth motors 440 and 450, and output the received position signal POS_S to the motor control device 610. The third and fourth motor drivers 442 and 452 receive the movement control signal MOVC_S outputted from the motor control device 610, and thereby drive the third and fourth motors 440 and 450 of the imaging portion 400 and adjust the position of the imaging lens 410 and the camera 420 of the imaging portion 400 to control magnification of the camera 420 for the zoom function.

Hereinafter, a method of measuring a 3D image by using the 3D image measuring apparatus according to the present invention constructed as above will be described.

Initially, the base member 100 is positioned in an inspection area I of the XY stage 100. When the base member 100 is positioned in the inspection area I, the first light 210 is switched on to a position, an angle, and a brightness, which is predetermined by the lattice movement and light control device 270. When the first light 210 is switched on and a light is generated from the first light 210, the generated light is projected towards the base member 100 via the first lattice 230 and the first projection lens 260 of the projection portion 200, and the first mirror 310, the third mirror 320, and the first filter 330 of the light path converter 300.

Next, when the light is projected towards the base member 100, an image is acquired while moving the lattice movement actuator 250 as many as a predetermined number. When the image is acquired, a reference phase with respect to the first light 210 is acquired by using a bucket algorithm. While acquiring the reference phase with respect to the first light 210, a reference phase with respect to the second light 212 is acquired by switching on the second light 212, and using the second lattice 232 and the second projection lens 262 of the projection portion 200, and the second mirror 312, the fourth mirror 322, and the second filter 332 of the light path converter 300.

When the reference phase with respect to each of the first light 210 and the second light 212 is acquired, the inspection object 120 is positioned in a predetermined part of the base member 100. When the inspection object 120 is positioned on the base member 100, the inspection object 120 is measured by switching at least one of the third light 340 and the fourth light 350 to the brightness predetermined by the lattice movement and light control device 270, and thereby sensing a position of the first identification mark 112 and the second identification mark 11, checking a position of the inspection object 120, and limiting the inspection area.

When the position of the inspection object is checked, the inspection object is moved by using the first motor 130 and the second motor 140. Every time the inspection object 120 is moved, a light, which is generated by switching on the first light 210 to the brightness predetermined by the lattice movement and light control device 270, is projected towards the inspection object 120 via the first lattice 230 and the first projection lens 260 of the projection portion 200, and the first mirror 310, the third mirror 320, and the first filter 330 of the light path converter 300.

When the generated light from the first light 210 is projected towards the inspection object 120, an image reflected from the inspection object 120 is acquired via the camera 420 of the imaging portion 400 and the third filter 402 of the light path converter 300. When a lattice image with respect to the first light 210 is acquired, a phase of the inspection object 120 is measured by using the acquired image. Next, 3D information of the inspection object 120 is acquired by using a difference between the reference phase and the measured phase. When the 3D information of the inspection object 120 with respect to the first light 210 is acquired, 3D information of the inspection object 120 with respect to the second light 212 is acquired by using the light generated from the second light 212 via the second lattice 232, the second projection lens 262, the second mirror 312, the fourth mirror 322, and the second filter 332, like the same method of using the light generated from the first light 210.

When the 3D information of the inspection object 120 with respect to the second light 212 is acquired, a sheet of 2D image with respect to the inspection object 120 is acquired without another light by using an average gray value of each pixel of the camera 420 of each image acquired by the first light 210, and finding a shadow area and a bright area by using a gray brightness value. Final 3D information of the inspection object 120 is acquired by exchanging a part corresponding to the shadow area with respect to the first light 210 with the 3D information acquired by the second light 212, and using the corrected 3D information using the second light 212.

In the acquiring of the image, how long it takes to acquire the image depends upon an image acquirement speed of the camera 420. Therefore, when acquiring the image, an exposure meter (not shown) of the camera 420 is exposed for a predetermined period of time in the camera 420. Also, the exposure is started through a synchronization with a trigger signal. Specifically, since the starting of the exposure can be known from the trigger signal, the lattice movement and light control device 270 moves a lattice as much as a desired interval by receiving the trigger signal and avoiding a fixed exposure time.

When the image is acquired via the third filter 402 and the camera 420 of the imaging portion 400, a predetermined number of images is acquired by adjusting the third filter 402 of the light path converter 300 and the imaging lens 410 and the camera 420 of the imaging portion 400 while moving the lattice movement actuator 250 as many as a predetermined number using the first main control signal MAIN1_S outputted from the first central control device 530. Specifically, as shown in FIG. 8, the position of the imaging lens 410 or the camera 420 is adjusted to acquire desired images.

Also, when the acquired image from the acquiring of the image via the third filter 402 and the camera 420 of the imaging portion 400 is inappropriate, an operation of adjusting a current magnification by adjusting the position of the imaging lens 410 or the camera 420 via the third motor 440 and the fourth motor 450 is further included. Through the above-described operation, the desired image may be acquired by adjusting the current magnification.

EFFECT OF THE INVENTION

As described above, a 3D image measuring apparatus according to the present invention may measure a 3D image by selectively using a plurality of lights and simultaneously using a plurality of filters, although an optical property and a geometrical shape of an inspection object is variously transformed.

What is claimed is:

1. A 3D measuring apparatus comprising:
   a stage supporting an object;
   a projection portion comprising:
     a first light source and a second light source generating a light,
     a first lattice and a second lattice disposed to pass the light generated by the first and second light sources respectively therethrough,
     a movement instrument controlling the first and second lattices through a predetermined number of movement actions, and
     a first projection lens and a second projection lens receiving the light from the first and the second lattices, respectively, to alternately project the light towards the object at least once for each movement action with respect to the movement instrument, and
   an imaging portion comprising:
     an imaging lens receiving a plurality of first reflected lights and a plurality of second reflected lights reflected by the object alternately, and
     a camera capturing a plurality of first images and a plurality of second images, having passed through the imaging lens, and
     a control device calculating a first 2D image and a second 2D image with respect to the object, the control device distinguishing shadow and bright areas to generate compensation corresponding thereto, based on respective average values of the first images and the second images, the control device thereby acquiring a 3D information with respect the object.

2. The apparatus of claim 1, wherein the first and second lattices are disposed on a lattice board.

3. The apparatus of claim 2, wherein the movement instrument comprises:
   a projection portion linear motion (LM) guide installed on one surface of the lattice board;
   a projection portion LM rail receiving the projection portion LM guide; and
   a lattice movement actuator installed in the projection portion LM guide to drive the projection portion LM guide.

4. The apparatus of claim 3, wherein the lattice movement actuator is installed with a feedback sensor to sense a movement position of the lattice board.

5. The apparatus of claim 1, further comprising a light path converter including a plurality of mirrors disposed to converts path of the light exiting from each of the first and second projection lenses.

6. The apparatus of claim 5, wherein the plurality of mirrors of the light path converter comprises a first mirror, a second mirror, a third mirror, and a fourth mirror, wherein the first mirror and the second mirror arc inclined towards a horizontal direction, and the third mirror and the fourth mirror are disposed at an outside position relative to the first mirror and the second mirror, respectively, and inclined towards a vertical direction.

7. The apparatus of claim 1, wherein the imaging portion further comprises an imaging portion movement instrument actuating a vertical movement of the imaging lens and camera.

8. The apparatus of claim 7, wherein the imaging portion movement instrument comprises:
   a first imaging portion support member installed with an imaging lens;
   a first imaging portion LM guide installed with the first imaging portion support member;
   a first imaging portion motor installed on the first imaging portion LM guide;
   a second imaging portion support member installed with the camera;
   a second imaging portion LM guide installed with the second imaging portion support member;
   a second imaging portion motor installed on the second imaging portion LM guide; and
   an imaging portion LM rail receiving the first imaging portion LM guide and the second imaging portion LM guide,
   wherein the first imaging portion motor moves the first imaging portion LM guide along the imaging portion LM rail, and the second imaging portion motor moves the second imaging portion LM guide along the imaging portion LM rail.

9. The apparatus of claim 1, wherein the 3D information acquired based on the second light is used as 3D information of the object when the first 2D image corresponds to a shadow area or a bright area.

10. The apparatus of claim 1, wherein the first and second lattices are concurrently controlled by the movement instrument.

11. A 3D measuring method comprising:
   acquiring a first reference phase with respect to a first light and a second reference phase with respect to a second light;
   positioning an inspection object on a stage;
   projecting the first light towards the inspection object via a first lattice and a first projection lens a predetermined number of times;
   projecting the second light towards the inspection object via a second lattice and a second projection lens a predetermined number of times;
   acquiring a plurality of first reflected images and a plurality of second reflected images from the inspection object via a camera;
   measuring a first phase and a second phase of the inspection object based on the first reflected images and the second reflected images respectively;

measuring a first 3D information of the inspection object based on a difference between the first reference phase and the first phase;

measuring a second 3D information of the inspection object based on a difference between the second reference phase and the second phase;

calculating a first 2D image with respect to the inspection object based on an average value of the first reflected images;

calculating a second 2D image with respect to the inspection object based on an average value of the second reflected images;

distinguishing shadow and bright areas based on the first 2D image and the second 2D image; and acquiring final 3D information of the inspection object based on compensation of the shadow or bright areas distinguished.

12. The method of claim 11, wherein the first and the second lattices are controlled simultaneously.

13. The method of claim 11, wherein acquiring the first and second reference phases comprises:

positioning a target in an inspection area of the stage;

switching on the first light at a position, angle, and brightness in a manner predetermined by a lattice movement device and a light control device;

projecting a generated light towards the target via the first lattice and the first projection lens;

acquiring images corresponding to each of the predetermined number of light projections, a lattice movement actuator being moved by the predetermined number;

acquiring the first reference phase with respect to the first light based on a bucket algorithm; and acquiring the second reference phase with respect to the second light by switching on the second light and projecting towards the target via the second lattice and the second projection lens.

14. The method of claim 11, wherein the second 3D information of the inspection object with respect to the second light is acquired while measuring the first 3D information of the inspection object with respect to the first light.

15. The method of claim 11, wherein the second 3D information of the inspection object with respect to the second light is acquired as the final 3D information of the inspection object when the first 2D image corresponds to a shadow or bright area.

16. The method of claim 11, further comprising acquiring an additional image upon adjusting the relative position of the imaging lens and camera when the image is determined to be inappropriate.

17. The method of claim 11, wherein movement of the first lattice and movement of the second lattice are simultaneously controlled by a movement instrument during projection of the light towards the inspection object via the first and second lattices and the first and second projection lenses.

18. The method of claim 11, wherein the compensation for a shadow or bright area includes discarding the first 3D information corresponding to a shadow area or bright area.

* * * * *